(12) United States Patent
Denmark

(10) Patent No.: US 10,405,531 B1
(45) Date of Patent: Sep. 10, 2019

(54) BOAT SEAT FISHING ACCESSORY ATTACHMENT

(71) Applicant: Lee Denmark, Cirtonelle, AL (US)

(72) Inventor: Lee Denmark, Cirtonelle, AL (US)

( * ) Notice: Subject to any disclaimer, the term of this patent is extended or adjusted under 35 U.S.C. 154(b) by 0 days.

(21) Appl. No.: 15/985,977

(22) Filed: May 22, 2018

(51) Int. Cl.
| | |
|---|---|
| A01K 97/22 | (2006.01) |
| A01K 97/06 | (2006.01) |
| A47C 7/62 | (2006.01) |
| A01K 97/04 | (2006.01) |
| B63B 35/14 | (2006.01) |
| B63B 29/04 | (2006.01) |

(52) U.S. Cl.
CPC .............. *A01K 97/22* (2013.01); *A01K 97/04* (2013.01); *A01K 97/06* (2013.01); *A47C 7/62* (2013.01); *B63B 35/14* (2013.01); *B63B 2029/043* (2013.01)

(58) Field of Classification Search
CPC ........ A01K 97/22; A01K 97/04; A01K 97/06; A47C 7/62; A47C 7/622; A47C 7/624; A47C 7/626; B63B 35/14; B63B 2029/043
USPC ............... 297/188.01, 188.03, 188.08, 217.1
See application file for complete search history.

(56) References Cited

U.S. PATENT DOCUMENTS

| | | | | |
|---|---|---|---|---|
| 3,623,683 A | * | 11/1971 | Bennett ................ | B64D 11/00 224/275 |
| 4,106,811 A | | 8/1978 | Hernandez | |
| 4,428,617 A | | 1/1984 | Lawson | |
| 4,645,167 A | | 2/1987 | Hardwick | |
| 4,682,813 A | * | 7/1987 | Fohr ..................... | A01K 97/06 108/151 |
| 4,745,704 A | * | 5/1988 | Schaefer ................ | A45C 5/00 297/188.12 |
| 4,790,432 A | * | 12/1988 | Rees ..................... | A01K 97/06 206/315.11 |
| 4,887,379 A | * | 12/1989 | Harrison ............... | A01K 97/06 43/54.1 |
| 4,999,943 A | * | 3/1991 | Crabtree ............... | A01K 97/06 43/54.1 |
| 5,481,822 A | * | 1/1996 | Engels .................. | A01K 97/06 297/188.12 |
| 5,560,145 A | * | 10/1996 | Anderson ............. | A01K 97/06 403/373 |
| 5,577,458 A | | 11/1996 | Kohl | |

(Continued)

FOREIGN PATENT DOCUMENTS

WO      2013119272      8/2013

*Primary Examiner* — Mark R Wendell
(74) *Attorney, Agent, or Firm* — Kyle A. Fletcher, Esq.

(57) ABSTRACT

The boat seat fishing accessory attachment is configured for use with a vessel. The vessel is further defined with a seat. The seat if further defined with a stanchion, a bench, and a plurality of bolts. The plurality of bolts attach the bench to the stanchion. The boat seat fishing accessory attachment attaches to the seat. The boat seat fishing accessory attachment provides storage. The boat seat fishing accessory attachment provides storage for tackle used for angling activities, segregated bait storage for angling activities, and a beverage for hydration. The boat seat fishing accessory attachment comprises a mounting plate, a plurality of extension structures, and a plurality of lockers. The mounting plate attaches the boat seat fishing accessory attachment to the seat. The plurality of extension structures attach the plurality of lockers to the mounting plate such that the plurality of lockers are accessible from the seat.

14 Claims, 4 Drawing Sheets

(56) References Cited

U.S. PATENT DOCUMENTS

| | | | | |
|---|---|---|---|---|
| D420,816 S | | 2/2000 | Wilcox | |
| 6,681,517 B1 | * | 1/2004 | Solomon | A01K 97/10 43/21.2 |
| 9,357,756 B2 | | 6/2016 | Davis | |
| 2005/0126064 A1 | * | 6/2005 | Winkler | A01K 97/06 43/21.2 |
| 2007/0283614 A1 | * | 12/2007 | Kessler | A01K 97/06 43/54.1 |
| 2010/0313464 A1 | * | 12/2010 | Bain | A01K 97/06 43/54.1 |
| 2011/0233357 A1 | * | 9/2011 | Owen | A01K 97/10 248/224.8 |
| 2018/0110335 A1 | * | 4/2018 | O'Hagan | A01K 97/22 |
| 2019/0125085 A1 | * | 5/2019 | O'Neal | A47C 7/68 |

\* cited by examiner

BOAT SEAT FISHING ACCESSORY ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and fishing including accessories for angling, more specifically, a seat box adapted for use in angling.

SUMMARY OF INVENTION

The boat seat fishing accessory attachment is configured for use with a vessel. The vessel is further defined with a seat. The seat if further defined with a stanchion, a bench, and a plurality of bolts. The plurality of bolts attach the bench to the stanchion. The boat seat fishing accessory attachment attaches to the seat. The boat seat fishing accessory attachment provides storage. The boat seat fishing accessory attachment provides storage for tackle used for angling activities, segregated bait storage for angling activities, and a beverage for hydration. The boat seat fishing accessory attachment comprises a mounting plate, a plurality of extension structures, and a plurality of lockers. The mounting plate attaches the boat seat fishing accessory attachment to the seat. The plurality of extension structures attach the plurality of lockers to the mounting plate such that the plurality of lockers are accessible from the seat.

These together with additional objects, features and advantages of the boat seat fishing accessory attachment will be readily apparent to those of ordinary skill in the art upon reading the following detailed description of the presently preferred, but nonetheless illustrative, embodiments when taken in conjunction with the accompanying drawings.

In this respect, before explaining the current embodiments of the boat seat fishing accessory attachment in detail, it is to be understood that the boat seat fishing accessory attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the boat seat fishing accessory attachment.

It is therefore important that the claims be regarded as including such equivalent construction insofar as they do not depart from the spirit and scope of the boat seat fishing accessory attachment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
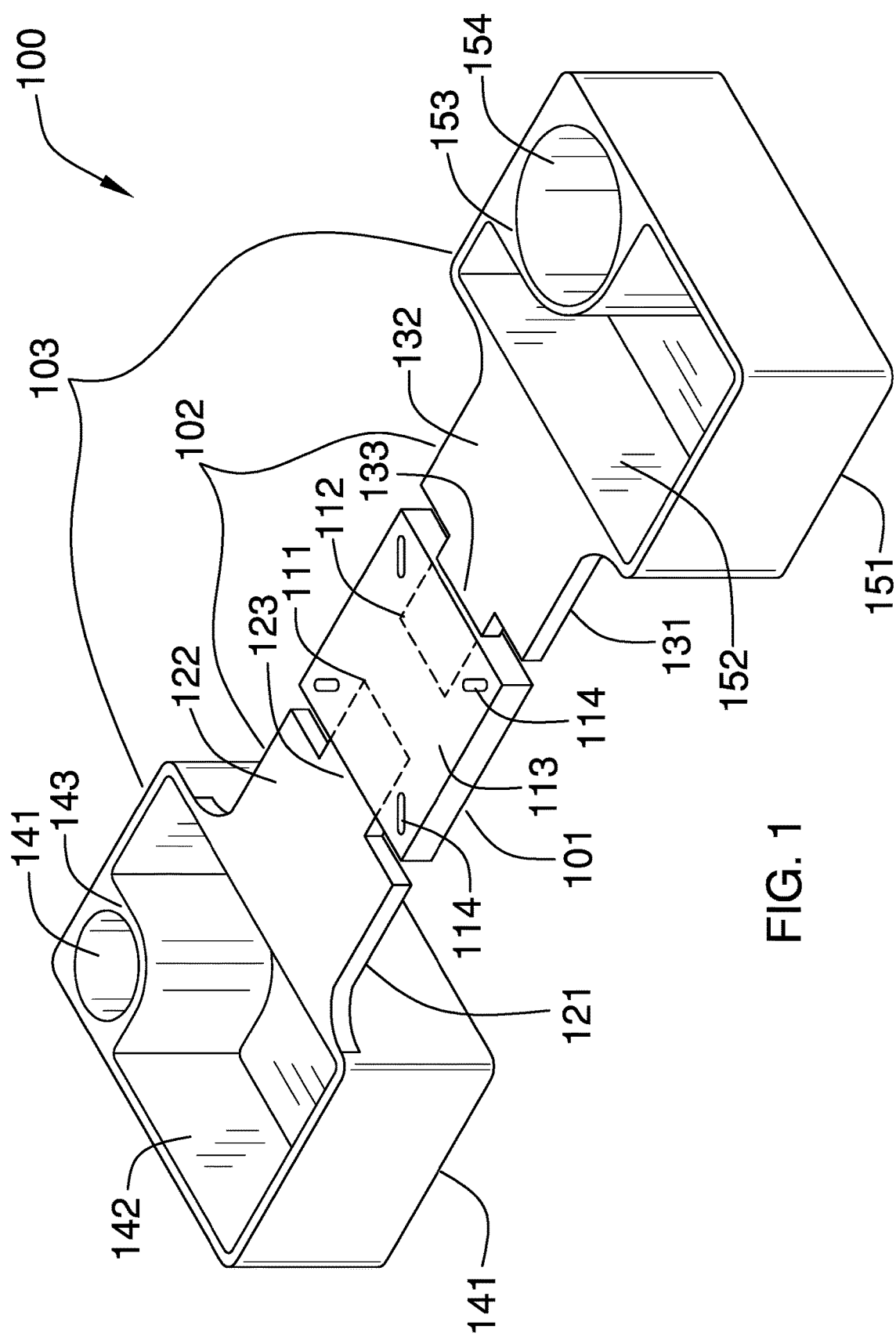
FIG. 1 is a perspective view of an embodiment of the disclosure.
Figure 2:
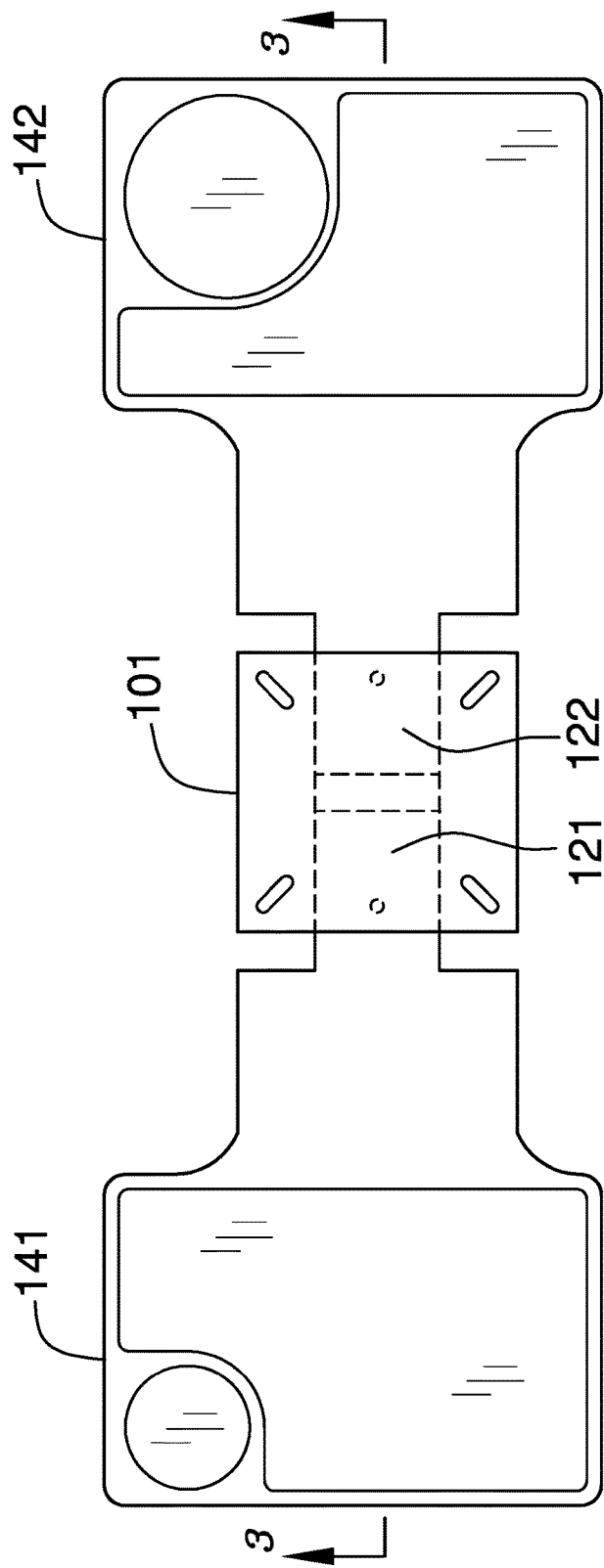
FIG. 2 is a top view of an embodiment of the disclosure.
Figure 3:
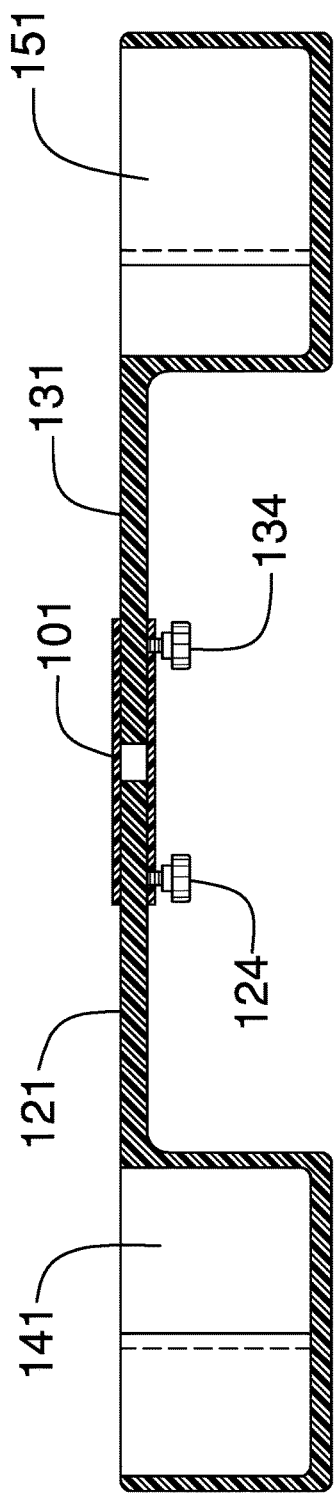
FIG. 3 is a cross-sectional view of an embodiment of the disclosure across 3-3 as shown in FIG. 2.
Figure 4:
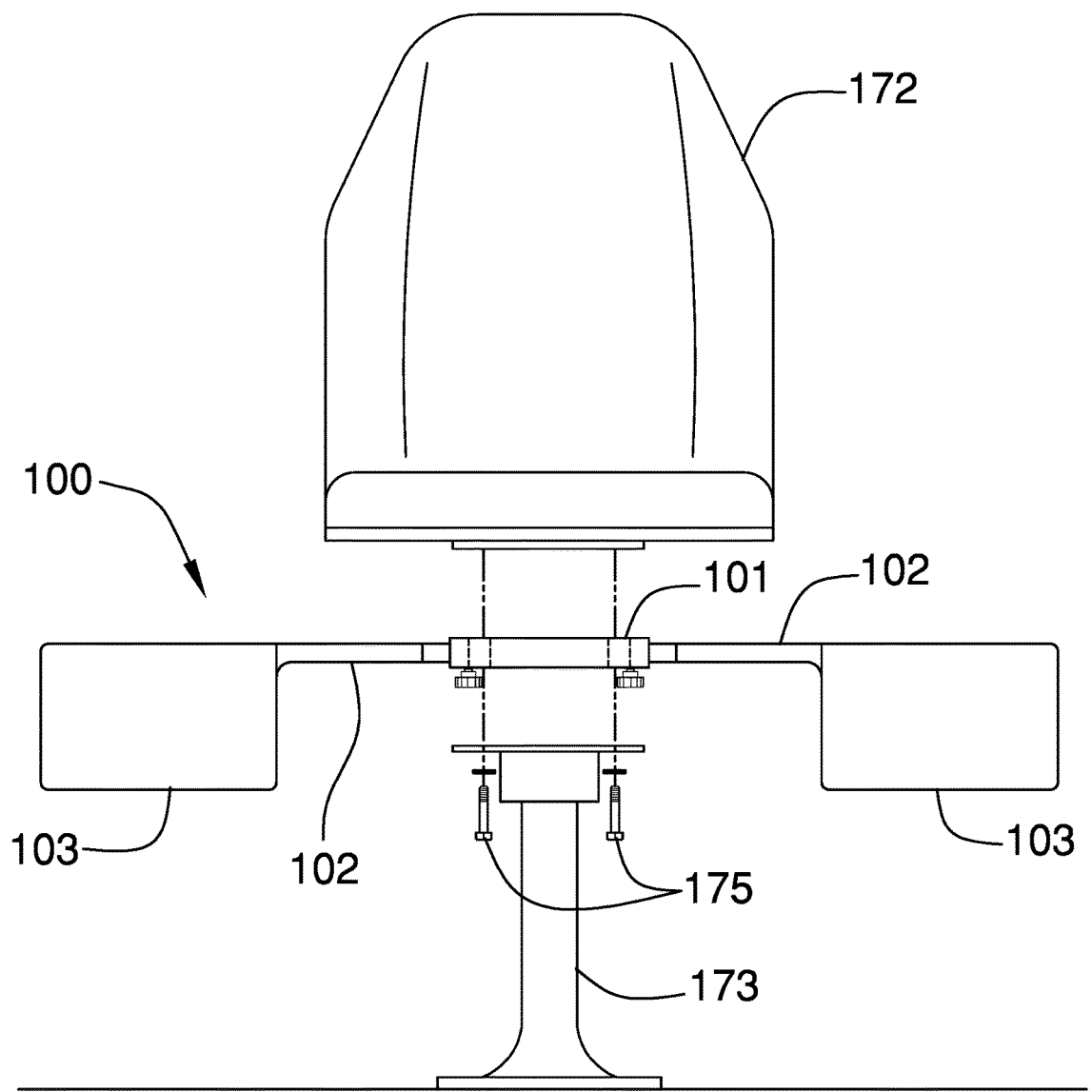
FIG. 4 is an exploded view of an embodiment of the disclosure.
Figure 5:
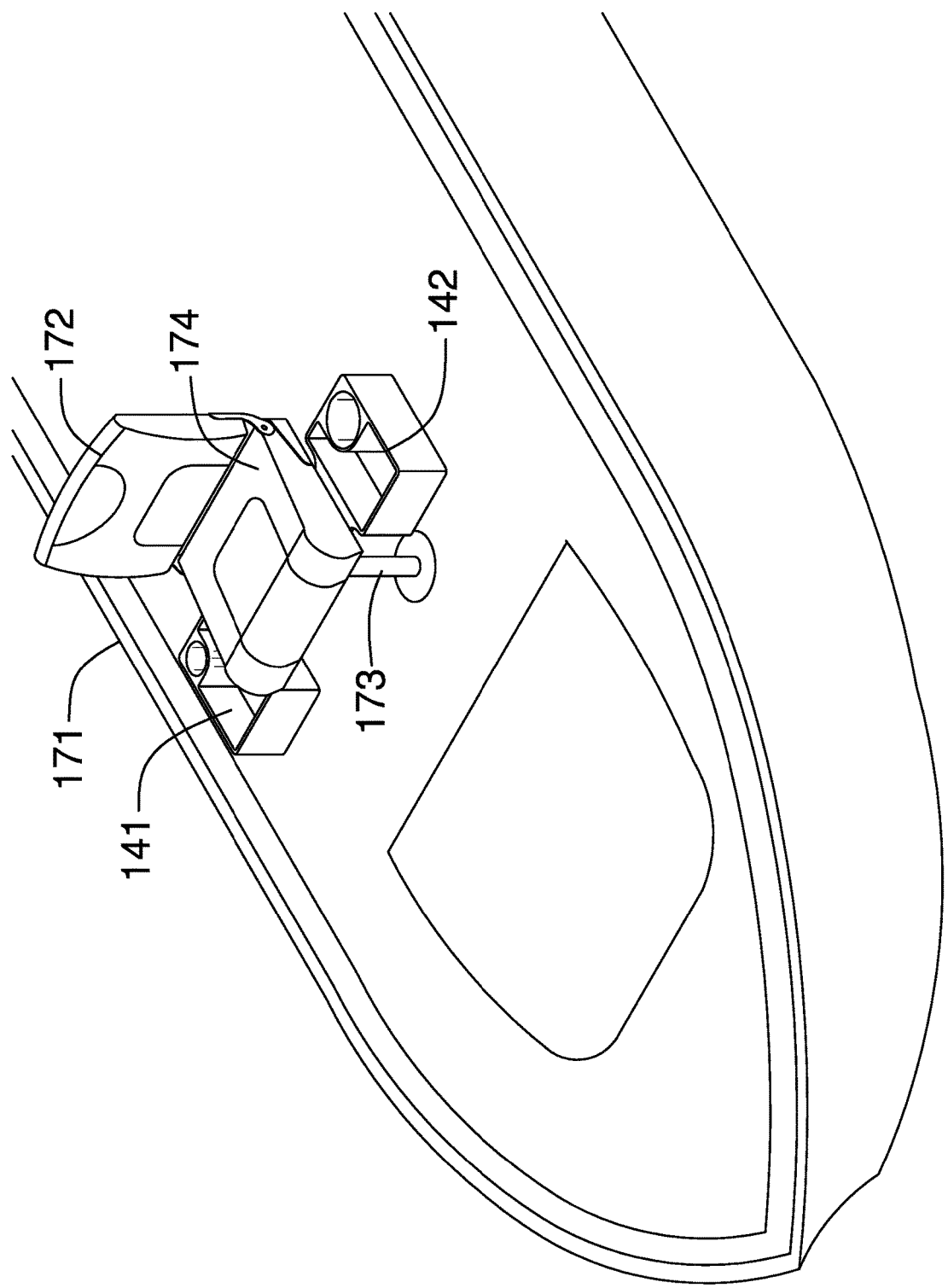
FIG. 5 is an in-use view of an embodiment of the disclosure.

Detailed reference will now be made to one or more potential embodiments of the disclosure, which are illustrated in FIGS. 1 through 5.

The boat seat fishing accessory attachment 100 (hereinafter invention) is configured for use with a vessel 171. The vessel 171 is further defined with a seat 172. The seat 172 is further defined with a stanchion 173, a bench 174, and a plurality of bolts 175. The plurality of bolts 175 attach the bench 174 to the stanchion 173. The invention 100 attaches to the seat 172. The invention 100 provides a storage arrangement configured for angling. The invention 100 provides storage for tackle used for angling activities, segregated bait storage for angling activities, and a beverage for hydration. The invention 100 comprises a mounting plate 101, a plurality of extension structures 102, and a plurality of lockers 103. The mounting plate 101 attaches the invention 100 to the seat 172. The plurality of extension structures 102 attach the plurality of lockers 103 to the mounting plate 101 such that the plurality of lockers 103 are accessible from the seat 172.

The mounting plate 101 is a rigid structure. The mounting plate 101 mounts between the stanchion 173 and the bench 174. The mounting plate 101 is secured to the bench 174 using the plurality of bolts 175 used to attach the bench 174 to the stanchion 173. The mounting plate 101 is a rectangular block structure. The mounting plate 101 comprises a support plate 113, a first mortise 111, a second mortise 112, and a plurality of mounting slots 114.

The support plate 113 is a plate that physically inserts between the stanchion 173 and the bench 174 of the seat 172.

The support plate 113 is a rigid structure. The support plate 113 has the shape of a rectangular block.

The first mortise 111 is a cavity formed in a vertical surface of the mounting plate 101. The second mortise 112 is a cavity formed in the vertical surface of the mounting plate 101 that is distal from the vertical surface that contains the first mortise 111.

Each of the plurality of mounting slots 114 is an aperture that is formed from the superior horizontal surface of the support plate 113 through to the inferior horizontal surface of the support plate 113. Each of the plurality of mounting slots 114 is an oval-shaped aperture that allows for the adjustment of the position of the mounting plate 101 during installation. Each of the plurality of mounting slots 114 is sized such that the plurality of bolts 175 will insert through the plurality of mounting slots 114 to attach the support plate 113 to the bench 174 of the seat 172.

Each of the plurality of extension structures 102 is a rigid structure. Each of the plurality of extension structures 102 is an extension structure. Each of the plurality of extension structures 102 attaches a locker selected from the plurality of lockers 103 to the mounting plate 101. Each of the plurality of extension structures 102 increases the span of distance between the mounting plate 101 and the locker selected from the plurality of lockers 103 such that the selected locker extends beyond the perimeter of the bench 174 of the seat 172 such that the selected locker is accessible. Each of the plurality of extension structures 102 removably attaches to the mounting plate 101. Each of the plurality of extension structures 102 permanently attaches to the locker selected from the plurality of lockers 103. The plurality of extension structures 102 comprises a first extension structure 121 and a second extension structure 131.

The first extension structure 121 attaches the first locker 141 to the mounting plate 101. The first extension structure 121 comprises a first extension plate 122, a first tenon 123, and a first thumbscrew 124.

The first extension plate 122 is a rigid structure. The first extension plate 122 has a rectangular block shape. The first extension plate 122 extends the distance between the mounting plate 101 and the first locker 141 such that the first locker 141 extends beyond the perimeter of the bench 174.

The first tenon 123 is a rigid rectangular block structure. The first tenon 123 attaches to the vertical surface of the first extension plate 122 that is distal from the first locker 141. The first tenon 123 is sized such that the first tenon 123 inserts into the first mortise 111 of the mounting plate 101. The first tenon 123 attaches the first extension plate 122 to the mounting plate 101 by inserting the first tenon 123 into the first mortise 111.

The first thumbscrew 124 is a hardware item that screws through the support plate 113 into the first tenon 123 to secure the support plate 113 to the mounting plate 101.

The second extension structure 131 attaches the second locker 151 to the mounting plate 101. The second extension structure 131 comprises a second extension plate 132, a second tenon 133, and a second thumbscrew 134.

The second extension plate 132 is a rigid structure. The second extension plate 132 has a rectangular block shape. The second extension plate 132 extends the distance between the mounting plate 101 and the second locker 151 such that the second locker 151 extends beyond the perimeter of the bench 174.

The second tenon 133 is a rigid rectangular block structure. The second tenon 133 attaches to the vertical surface of the second extension plate 132 that is distal from the second locker 151. The second tenon 133 is sized such that the second tenon 133 inserts into the second mortise 112 of the mounting plate 101. The second tenon 133 attaches the second extension plate 132 to the mounting plate 101 by inserting the second tenon 133 into the second mortise 112.

The second thumbscrew 134 is a hardware item that screws through the support plate 113 into the second tenon 133 to secure the support plate 113 to the mounting plate 101.

Each of the plurality of lockers 103 is a hollow rectangular block structure. Each of the plurality of lockers 103 is configured to receive one or more objects selected from the group consisting of fishing tackle, bait, and a beverage. The superior face of each of the plurality of lockers 103 is open such that access is gained into the hollow interior of the plurality of lockers 103. Each of the plurality of lockers 103 is a semi-rigid structure. The plurality of lockers 103 comprises a first locker 141 and a second locker 151.

The first locker 141 is a hollow rectangular block structure. The first locker 141 is a semi-rigid structure. The superior face of the first locker 141 is open such that access into the hollow interior is gained through the open superior face. The first locker 141 comprises a first tackle chamber 142, a first partition 143, and a drink holder 144.

The hollow interior space of the first locker 141 is organized into chambers using the first partition 143. The first partition 143 is a solid vertical boundary surface formed within the hollow interior of the first locker 141. The first partition 143 segregates a hollow cylindrical space within the hollow interior of the first locker 141. The hollow cylindrical space formed within the first locker 141 is the chamber that forms the drink holder 144. The drink holder 144 is sized such that the drink holder 144 will securely store a beverage when hydration is not immediately required.

The first tackle chamber 142 comprises the balance of the hollow space within the first locker 141. The first tackle chamber 142 is a general storage space intended to store tackle.

The second locker 151 is a hollow rectangular block structure. The second locker 151 is a semi-rigid structure. The superior face of the second locker 151 is open such that access into the hollow interior is gained through the open superior face. The second locker 151 comprises a second tackle chamber 152, a second partition 153, and a bait locker 154.

The hollow interior space of the second locker 151 is organized into chambers using the second partition 153. The second partition 153 is a solid vertical boundary surface formed within the hollow interior of the second locker 151. The second partition 153 segregates a hollow cylindrical space within the hollow interior of the second locker 151. The hollow cylindrical space formed within the second locker 151 is the chamber that forms the bait locker 154. The bait locker 154 is sized such that the bait locker 154 will securely store live bait separately from the tackle.

The second tackle chamber 152 comprises the balance of the hollow space within the second locker 151. The second tackle chamber 152 is a general storage space intended to store tackle.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Bench: As used in this disclosure, a bench is a horizontal supporting surface formed by a chair.

Beverage: As used in this disclosure, a beverage is a liquid that is intended for consumption by a person.

Bolt: As used in this disclosure, a bolt is a cylindrical shaft formed with an exterior screw thread. A bolt is defined with an outer diameter.

Chamber: As used in this disclosure, a chamber is a space that is dedicated to a purpose.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Extension Structure: As used in this disclosure, an extension structure is an inert physical structure that is used to extend the span of the distance between any two objects.

Fishing Hook: As used in this disclosure, a fishing hook is a hook with a sharpened, and often barbed, end that is used to capture a fish.

Fishing Line: As used in this disclosure, a fishing line is a monofilament cord to which a hook attaches for the purpose of capturing a fish.

Hardware: As used in this disclosure, refers to a one or more incidental objects: 1) that are readily and commercially available; and, 2) that are associated with the installation, operation or maintenance of a primary object.

Horizontal: As used in this disclosure, horizontal is a directional term that refers to a direction that is either: 1) parallel to the horizon; 2) perpendicular to the local force of gravity; or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Intermediate: As used in this disclosure, the term intermediate refers to a location that lies between a first object and a second object Leader: As used in this disclosure, a leader is a length of cord that is a wire or monofilament cord to a fishing line to a lure or hook. The lure or hook is often connected to the leader with a swivel that prevents twisting of the fishing line or the leader from influencing the motion of the lure or hook while in the water.

Mortise: As used in this disclosure, a mortise is a cavity formed in a material that is designed to receive a similarly shaped object such that the similarly shaped object is flush to the surface of the material.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screw into the first object forming a threaded connection. A nut is further defined with an inner diameter.

Oval: As used in this disclosure, an oval is a geometric shape that is formed in the shape of a "squished" circle similar in form to an ellipse. The difference between an oval and an ellipse is that an ellipse can be described by a mathematical formula while an oval has no such description. The term ovoid refers to a three-dimensional structure with an oval shape that is analogous to the relationship of an ellipsoid and an ellipse.

Partition: As used in this disclosure, a partition is a vertical surface that bifurcates a defined space into smaller defined spaces.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal, plastic, and wood. When made of wood, a plate is often referred to as a board.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangular Block: As used in this disclosure, a rectangular block refers to a three-dimensional structure comprising six rectangular surfaces formed at right angles. Within this disclosure, a rectangular block may further comprise rounded edges and corners.

Rigid Structure: As used in this disclosure, a rigid structure is a solid structure formed from an inelastic material that resists changes in shape. A rigid structure will permanently deform as it fails under a force.

Screw: As used in this disclosure, to screw is a verb meaning: 1) to fasten or unfasten (unscrew) a threaded connection; or 2) to attach a helical structure to a solid structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Stanchion: As used in this disclosure, a stanchion refers to a vertical pole, post, or support. See beam and gusset and strut Superior: As used in this disclosure, the term superior refers to a directional reference that is parallel to and in the opposite direction of the force of gravity when an object is positioned or used normally.

Swivel: As used in this disclosure, a swivel is a device used in fishing to prevent a fishing line from twisting during use.

Tenon: As used in this disclosure, a tenon is a structure that projects away from an edge a first object (often the end of a piece of wood). The tenon is sized and shaped to fit into a mortise that is formed in a second object such that the first object can be attached to the second object by inserting the tenon in the matching mortise.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Vehicle: As used in this disclosure, a vehicle is a device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vessel: As used in this disclosure, a vessel is a type of vehicle. A vessel transports passengers, goods, or equipment over water.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A seat box comprising:
a mounting plate, a plurality of extension structures, and a plurality of lockers;
wherein the mounting plate attaches the seat box to the seat;
wherein the plurality of extension structures attach the plurality of lockers to the mounting plate such that the plurality of lockers are accessible from the seat;
wherein the seat box is configured for use with a seat of a vessel;
wherein the seat box is configured to attach to the seat;
wherein the seat box provides a storage arrangement configured for angling;
wherein the mounting plate is configured to mount between a stanchion and a bench of the vessel;
wherein the mounting plate is configured to be secured to the bench using a plurality of bolts;
wherein each of the plurality of extension structures attaches a locker selected from the plurality of lockers to the mounting plate;
wherein each of the plurality of extension structures increases the span of distance between the mounting plate and the locker selected from the plurality of lockers such that the selected locker is configured to extend beyond a perimeter of the bench of the seat;
wherein each of the plurality of extension structures removably attaches to the mounting plate;
wherein each of the plurality of extension structures permanently attaches to the locker selected from the plurality of lockers;
wherein the mounting plate comprises a support plate, a first mortise, a second mortise, and a plurality of mounting slots;
wherein the first mortise, the second mortise, and the plurality of mounting slots are formed in the support plate;
wherein the support plate is configured to be positioned between the stanchion and the bench of the seat;

wherein the first mortise is a cavity formed in a first vertical surface of the mounting plate;
wherein the second mortise is a cavity formed in a second vertical surface of the mounting plate;
wherein the second vertical surface is distal from the first vertical surface.

2. The seat box according to claim 1 wherein each of the plurality of mounting slots is an aperture that is formed through support plate.

3. The seat box according to claim 2
wherein each of the plurality of mounting slots is an oval-shaped aperture that allows for the adjustment of the position of the mounting plate during installation;
wherein each of the plurality of mounting slots is configured to be sized such that the plurality of bolts will insert through the plurality of mounting slots to attach the support plate to the bench of the seat.

4. The seat box according to claim 3
wherein the plurality of extension structures comprises a first extension structure and a second extension structure;
wherein the first extension structure attaches the first locker to the mounting plate;
wherein the second extension structure attaches the second locker to the mounting plate.

5. The seat box according to claim 4
wherein the first extension plate is a rigid structure;
wherein the second extension plate is a rigid structure;
wherein the first extension plate has a rectangular block shape;
wherein the second extension plate has a rectangular block shape.

6. The seat box according to claim 5
wherein the first extension structure comprises a first extension plate, a first tenon, and a first thumbscrew;
wherein the first tenon attaches to the first extension plate;
wherein the first thumbscrew secures the first tenon to the mounting plate.

7. The seat box according to claim 6
wherein the second extension structure comprises a second extension plate, a second tenon, and a second thumbscrew;
wherein the second tenon attaches to the second extension plate;
wherein the second thumbscrew secures the second tenon to the mounting plate.

8. The seat box according to claim 7 wherein the first extension plate extends the distance between the mounting plate and the first locker.

9. The seat box according to claim 8 wherein the second extension plate extends the distance between the mounting plate and the second locker.

10. The seat box according to claim 9
wherein the first tenon is a rigid rectangular block structure;
wherein the first tenon attaches to a third vertical surface of the first extension plate that is distal from the first locker;
wherein the first tenon is sized such that the first tenon inserts into the first mortise;
wherein the first tenon attaches the first extension plate to the mounting plate by inserting the first tenon into the first mortise.

11. The seat box according to claim 10
wherein the second tenon is a rigid rectangular block structure;
wherein the second tenon attaches to a fourth vertical surface of the second extension plate that is distal from the second locker;
wherein the second tenon is sized such that the second tenon inserts into the second mortise of the mounting plate;
wherein the second tenon attaches the second extension plate to the mounting plate by inserting the second tenon into the second mortise.

12. The seat box according to claim 11
wherein the plurality of lockers comprises a first locker and a second locker;
wherein the first locker is a hollow rectangular block structure;
wherein the first locker is a semi-rigid structure;
wherein the superior face of the first locker is open such that access into the hollow interior is gained through the open superior face;
wherein the second locker is a hollow rectangular block structure;
wherein the second locker is a semi-rigid structure;
wherein the superior face of the second locker is open such that access into the hollow interior is gained through the open superior face.

13. The seat box according to claim 12
wherein the first locker comprises a first tackle chamber, a first partition, and a drink holder;
wherein the hollow interior space of the first locker is organized into chambers using the first partition;
wherein the first partition is a solid vertical boundary surface formed within the hollow interior of the first locker;
wherein the first partition segregates a hollow cylindrical space within the hollow interior of the first locker;
wherein the hollow cylindrical space formed within the first locker is the chamber that forms the drink holder;
wherein the first tackle chamber comprises the balance of the hollow space within the first locker.

14. The seat box according to claim 13
wherein the second locker comprises a second tackle chamber, a second partition, and a bait locker;
wherein the hollow interior space of the second locker is organized into chambers using the second partition;
wherein the second partition is a solid vertical boundary surface formed within the hollow interior of the second locker;
wherein the second partition segregates a hollow cylindrical space within the hollow interior of the second locker;
wherein the hollow cylindrical space formed within the second locker is the chamber that forms the bait locker;
wherein the second tackle chamber comprises the balance of the hollow space within the second locker.

* * * * *